US005699477A

United States Patent [19]

McCree

[11] Patent Number: 5,699,477

[45] Date of Patent: Dec. 16, 1997

[54] MIXED EXCITATION LINEAR PREDICTION WITH FRACTIONAL PITCH

[75] Inventor: Alan V. McCree, Dallas, Tex.

[73] Assignee: Texas Instruments Incorporated, Dallas, Tex.

[21] Appl. No.: 336,593

[22] Filed: Nov. 9, 1994

[51] Int. Cl.[6] .................... G01L 3/02; G01L 9/00

[52] U.S. Cl. .................... 395/2.25; 395/2.16; 395/2.28

[58] Field of Search .................... 395/2.32, 2.16, 395/2.3, 2.14, 2.74, 2.31, 2.76, 2.28, 2.41; 381/37; 375/350

[56] References Cited

U.S. PATENT DOCUMENTS

| | | | |
|---|---|---|---|
| 3,789,137 | 1/1974 | Newell | 395/2.14 |
| 4,004,096 | 1/1977 | Bauer et al. | 395/2.16 |
| 4,052,563 | 10/1977 | Noda et al. | 179/1 |
| 4,301,329 | 11/1981 | Tagushi | 381/37 |
| 4,574,278 | 3/1986 | Apelman | 340/722 |
| 4,611,333 | 9/1986 | McCallister et al. | 375/1 |
| 4,776,014 | 10/1988 | Zinser, Jr. | 395/2.71 |
| 5,027,404 | 6/1991 | Tagushi | 395/2.3 |
| 5,293,449 | 3/1994 | Tzeng | 395/2.32 |
| 5,359,696 | 10/1994 | Gerson et al. | 395/2.72 |
| 5,432,883 | 7/1995 | Yoshihara | 395/2.28 |
| 5,444,816 | 8/1995 | Adoul et al. | 395/2.28 |
| 5,450,449 | 9/1995 | Kroon | 375/350 |

*Primary Examiner*—Allen R. MacDonald
*Assistant Examiner*—Patrick N. Edouard
*Attorney, Agent, or Firm*—Carlton H. Hoel; W. James Brady; Richard L. Donaldson

[57] ABSTRACT

An analyzer and synthesizer (500) for human speech using LPC filtering (530) of an excitation of mixed (508-518-520) voiced pulse train (502) and unvoiced noise (512) with fractional sampling period pitch period determination.

8 Claims, 10 Drawing Sheets

SUSTAINED VOWEL /ae/: (A) WAVEFORM AND (B) FOURIER SPECTRUM

SUSTAINED FRICATIVE /sh/: (A) WAVEFORM AND (B) FOURIER SPECTRUM

MIXED EXCITATION LINEAR PREDICTION WITH FRACTIONAL PITCH

CROSS-REFERENCE TO RELATED APPLICATIONS

Copending application Ser. No. 08/218,003, filed Mar. 25, 1994, contains related subject matter and has a common assignee with this application.

BACKGROUND OF THE INVENTION

The invention relates to electronic devices, and, more particularly, to speech coding, transmission, storage, and synthesis circuitry and methods.

Human speech consists of a stream of acoustic signals with frequencies ranging up to roughly 20 KHz; however, the band of about 100 Hz to 5 KHz contains the bulk of the acoustic energy. Telephone transmission of human speech originally consisted of conversion of the analog acoustic signal stream into an analog voltage signal stream (e.g., use a microphone) for transmission and reconversion to an acoustic signal stream (e.g., use a loudspeaker). The electrical signals would be bandpass filtered to retain only the 300 Hz to 4 KHz band to limit bandwidth and avoid low frequency problems. However, the advantages of digital electrical signal transmission has inspired a conversion to digital telephone transmission beginning in the 1960s. Typically, digital telephone signals derive from sampling analog signals at 8 KHz and nonlinearly quantizing the samples with 8 bit codes according to the μ-law (pulse code modulation, or PCM). A clocked digital-to-analog converter and companding amplifier reconstruct an analog electric signal stream from the stream of 8-bit samples. Such signals require transmission rates of 64 Kbps (kilobits per second) and this exceeds the former analog signal transmission bandwidth.

The storage of speech information in analog format (for example, on magnetic tape in a telephone answering machine) can likewise by replaced with digital storage. However, the memory demands can become overwhelming: 10 minutes of 8-bit PCM sampled at 8 KHz would require about 5 MB (megabytes) of storage.

The demand for lower transmission rates and storage requirements has led to development of compression for speech signals. One approach to speech compression models the physiological generation of speech and thereby reduces the necessary information to be transmitted or stored. In particular, the linear speech production model presumes excitation of a variable filter (which roughly represents the vocal tract) by either a pulse train with pitch period P (for voiced sounds) or white noise (for unvoiced sounds) followed by amplification to adjust the loudness. 1/A(z) traditionally denotes the z transform of the filter's transfer function. The model produces a stream of sounds simply by periodically making a voiced/unvoiced decision plus adjusting the filter coefficients and the gain. Generally, see Markel and Gray, Linear Prediction of Speech (Springer-Verlag 1976). FIG. 1 illustrates the model, and FIGS. *2a*–*3b* illustrate sounds. In particular, FIG. *2a* shows the waveform for the voiced sound |ae| and FIG. *2b* its Fourier transform; and FIG. *3a* shows the unvoiced sound |sh| and FIG. *3b* its Fourier transform.

The filter coefficients may be derived as follows. First, let s'(t) be the analog speech waveform as a function of time, and e'(t) be the analog speech excitation (pulse train or white noise). Take the sampling frequency $f_s$ to have period T (so $f_s$=1/T), and set s(n)=s'(nT) (so . . . s(n−1), s(n), s(n+1), . . . is the stream of speech samples), and set e(n)=e'(nT) (so . . . e(n−1), e(n), e(n+1), . . . are the samples of the excitation). Then taking z transforms yields S(z)=E(z)/A(z) or, equivalently, E(z)=A(z)S(z) where 1/A(z) is the z transform of the transfer function of the filter. A(z) is an all-zero filter and 1/A(z) is an all-pole filter. Deriving the excitation, gain, and filter coefficients from speech samples is an analysis or coding of the samples, and reconstructing the speech from the excitation, gain, and filter coefficients is a decoding or synthesis of speech. The peaks in 1/A(z) correspond to resonances of the vocal tract and are termed "formants". FIG. 4 heuristically shows the relations between voiced speech and voiced excitation with a particular filter A(z).

With A(z) taken as a finite impulse response filter of order M, the equation E(z)=A(z)S(z) in the time domain becomes, with a(0)=1 for normalization:

$$e(n)=\Sigma_j a(j)s(n-j)\ 0\leqq j\leqq M = s(n)+\Sigma_j a(j)s(n-j)\ 1\leqq j\leqq M$$

Thus by deeming e(n) a "linear prediction error" between the actual sample s(n) and the "linear prediction" sum a(j)s(n−j), the filter coefficients a(j) can be determined from a set of samples s(n) by minimizing the prediction "error" sum $e(n)^2$.

A stream of speech samples s(n) may be partitioned into "frames" of 180 successive samples (22.5 msec intervals), and the samples in a frame provide the data for computing the filter coefficients for use in coding and synthesis of the sound associated with the frame. Typically, M is taken as 10 or 12. Encoding a frame requires bits for the LPC coefficients, the pitch, the voiced/unvoiced decision, and the gain, and so the transmission rate may be only 2.4 Kbps rather than the 64 Kbps of PCM. In practice, the filter coefficients must be quantized for transmission, and the sensitivity of the filter behavior on the quantization error has led to quantization based on the Line Spectrum Pair representation.

The pitch period P determination presents a difficult problem because 2P, 3P, . . . are also periods and the sampling quantization and the formants can distort magnitudes. In fact, W. Hess, Pitch Determination of Speech Signals (Springer, 1983) presents many different methods for pitch determination. For example, the pitch period estimation for a frame may be found by searching for maximum correlations of translates of the speech signal. Indeed, Medan et al, Super Resolution Pitch Determination of Speech Signals, 39 IEEE Tr.Sig.Proc. 40 (1991) describe a pitch period determination which first looks at correlations of two adjacent segments of speech with variable segment lengths and determines an integer pitch as the segment length which yields the maximum correlation. Then linear interpolation of correlations about the maximum correlation gives a pitch period which may be a nonintegral multiple of the sampling period.

The voiced/unvoiced decision for a frame may be made by comparing the maximum correlation c(k) found in the pitch search with a threshold value: if the maximum c(k) is too low, then the frame will be unvoiced, otherwise the frame is voiced and uses the pitch period found.

The overall loudness of a frame may be estimated simply as the root-mean-square of the frame samples taking into account the gain of the LPC filtering. This provides the gain to apply in the synthesis.

To reduce the bit rate, the coefficients for successive frames may be interpolated.

However, to improve the sound quality, further information may be extracted from the speech, compressed and transmitted or stored. For example, the codebook excitation linear prediction (CELP) method first analyzes a speech frame to find A(z) and filter the speech, next, a pitch period determination is made and a comb filter removes this periodicity to yield a noise-looking excitation signal. Then the excitation signals are encoded in a codebook. Thus CELP transmits the LPC filter coefficients, the pitch, and the codebook index of the excitation.

Another approach is to mix voiced and unvoiced excitations for the LPC filter. For example, McCree, A New LPC Vocoder Model for Low Bit Rate Speech Coding, PhD thesis, Georgia Institute of Technology, August 1992, divide the excitation frequency range into bands, make the voiced/unvoiced mixture decision in each band separately, and combine the results for the total excitation. The pitch determination proceeds as follows. First, lowpass filter (cutoff at about 1200 Hz) the speech because the pitch frequency should fall in the range of 100 Hz to 400 Hz. Next, filter with A(z) in order to remove the formant structure and, hopefully, yield e(n). Then compute a normalized correlation for each translate k:

$$c(k)=\Sigma e(n)e(n-k)/\sqrt{(\Sigma e(n)^2\Sigma e(n-k)^2)}$$

where both sums are over a fixed number of samples, which should be as large as the maximum expected pitch period. The k maximizing c(k) yields a pitch period estimation as kT. Then check whether kT is in fact a multiple of a fundamental pitch period. A frame is classified as strongly voiced if a maximum normalized c(k) is greater than 0.7, weakly voiced if the maximum c(k) is between 0.4 and 0.7, and further analyzed if the maximum c(k) is less than 0.4. A maximum c(k) less than 0.4 may be due to unvoiced sounds or the A(z) filtering may be obscuring the pitch as when the pitch frequency lies close to a formant, so again compute correlations but using the unfiltered speech signals s(n). If the maximum correlation is still small, then the frame will be classified as unvoiced.

SUMMARY OF THE INVENTION

The present invention recognizes that in the mixed excitation linear prediction method the inaccuracy of an integer period pitch determination for high-pitched female speakers can lead to a locking on to a pitch for artifically long time periods with abrupt discontinuity in the pitch contour at a change to a new pitch. Also, the invention recognizes telephone-bandwidth speech typically has filtered out the 100–200 Hz pitch fundamental for male speakers and this leads to pitch estimation and excitation mixture errors. The invention provides pitch period determinations which do not have to be multiples of the sampling period and uses the corresponding correlations for mixture control and also for integer pitch determinations.

The invention has technical advantages including natural sounding speech from a low bit rate encoding.

BRIEF DESCRIPTION OF THE DRAWINGS

The drawings are schematic for clarity.

DESCRIPTION OF THE PREFERRED EMBODIMENTS

First preferred embodiment overview.

Figure 1:
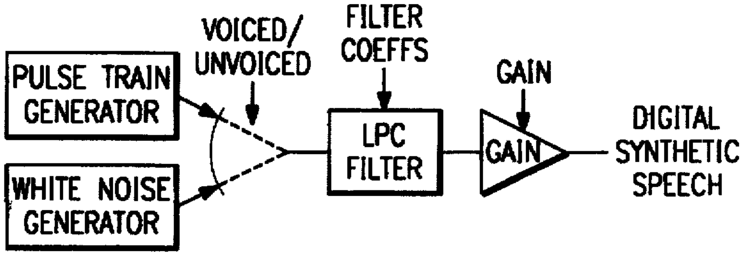
FIG. 1 illustrates a general LPC speech synthesizer.
Figure 2A:
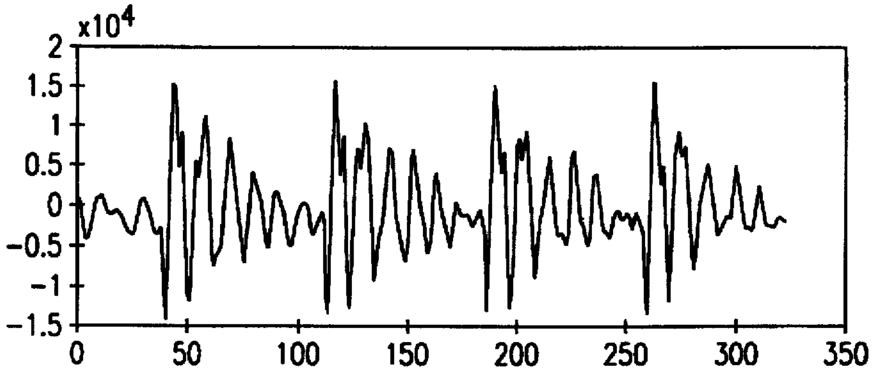
FIGS. 2*a–b* show a voiced sound.
Figure 2B:
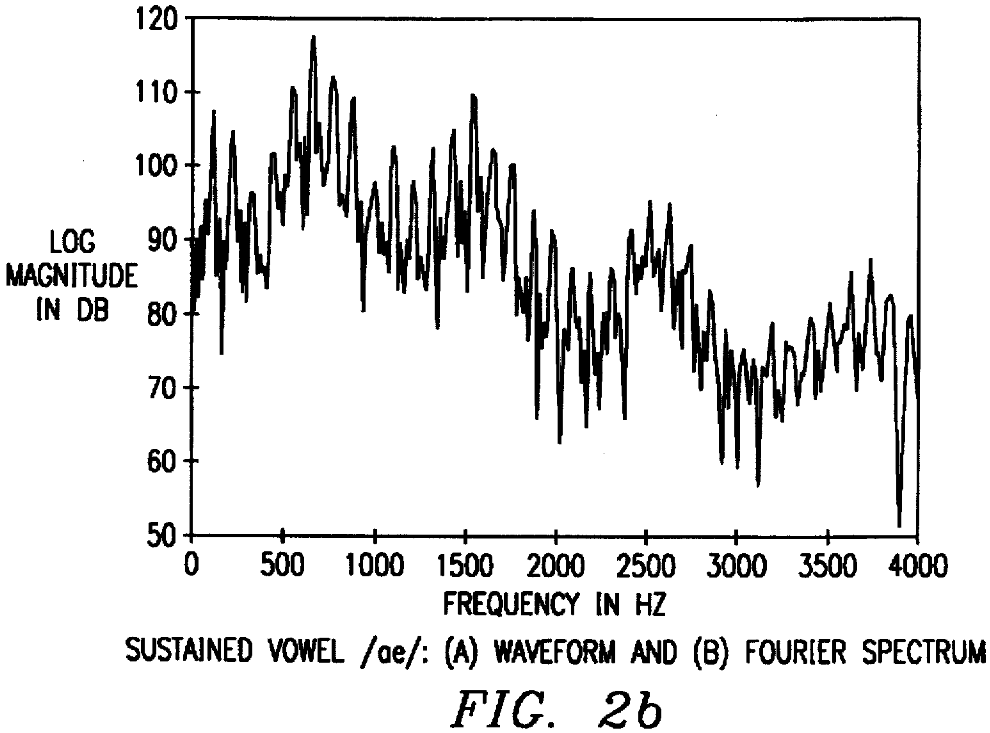
Figure 3A:
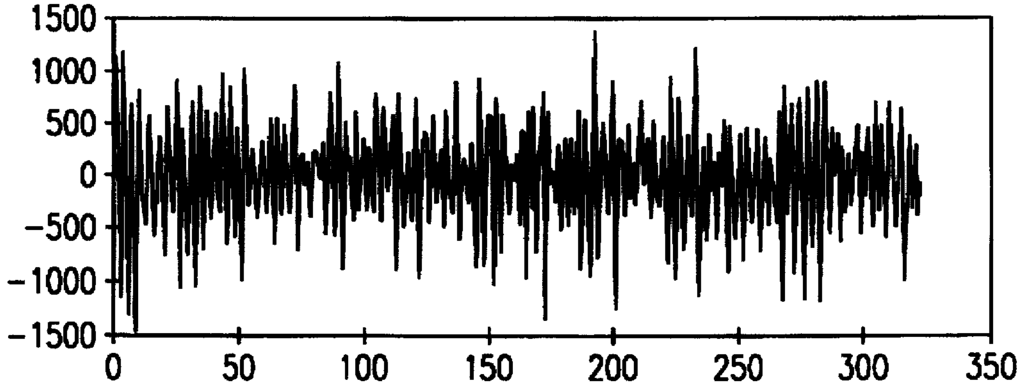
FIGS. 3*a–b* show an unvoiced sound.
Figure 3B:
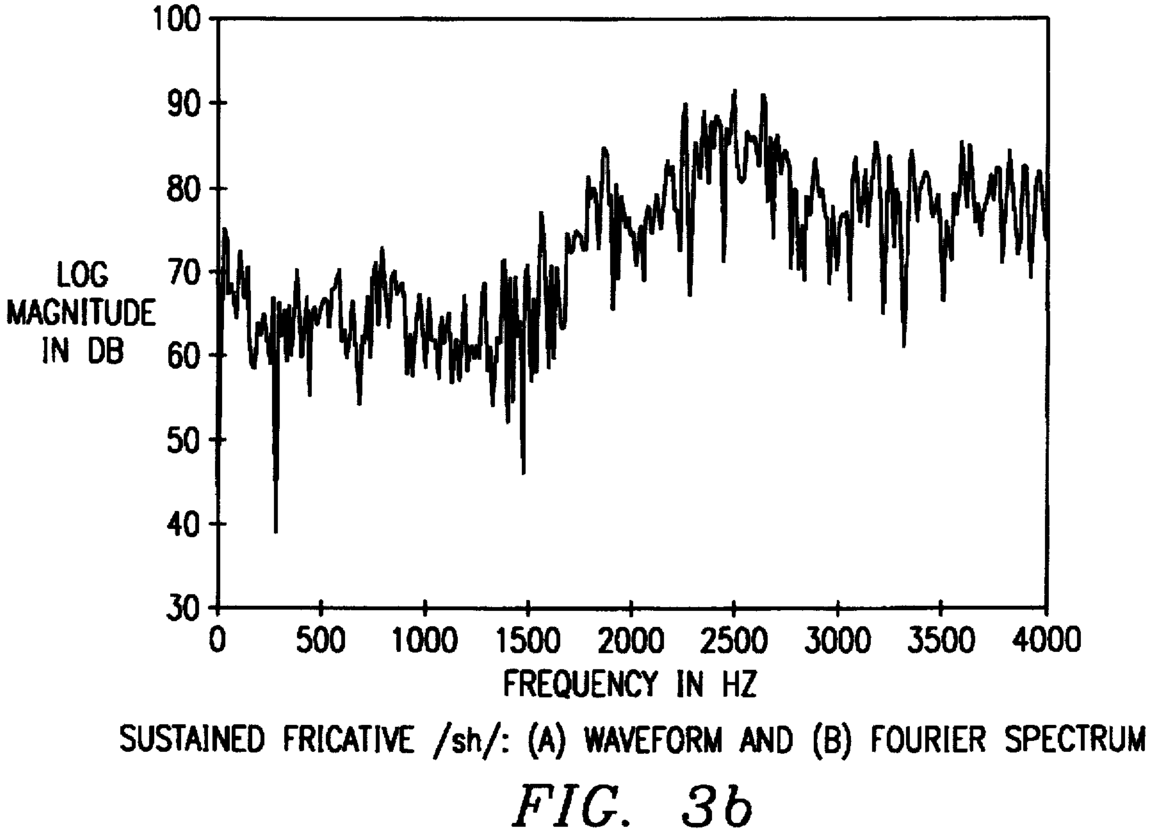
Figure 4:
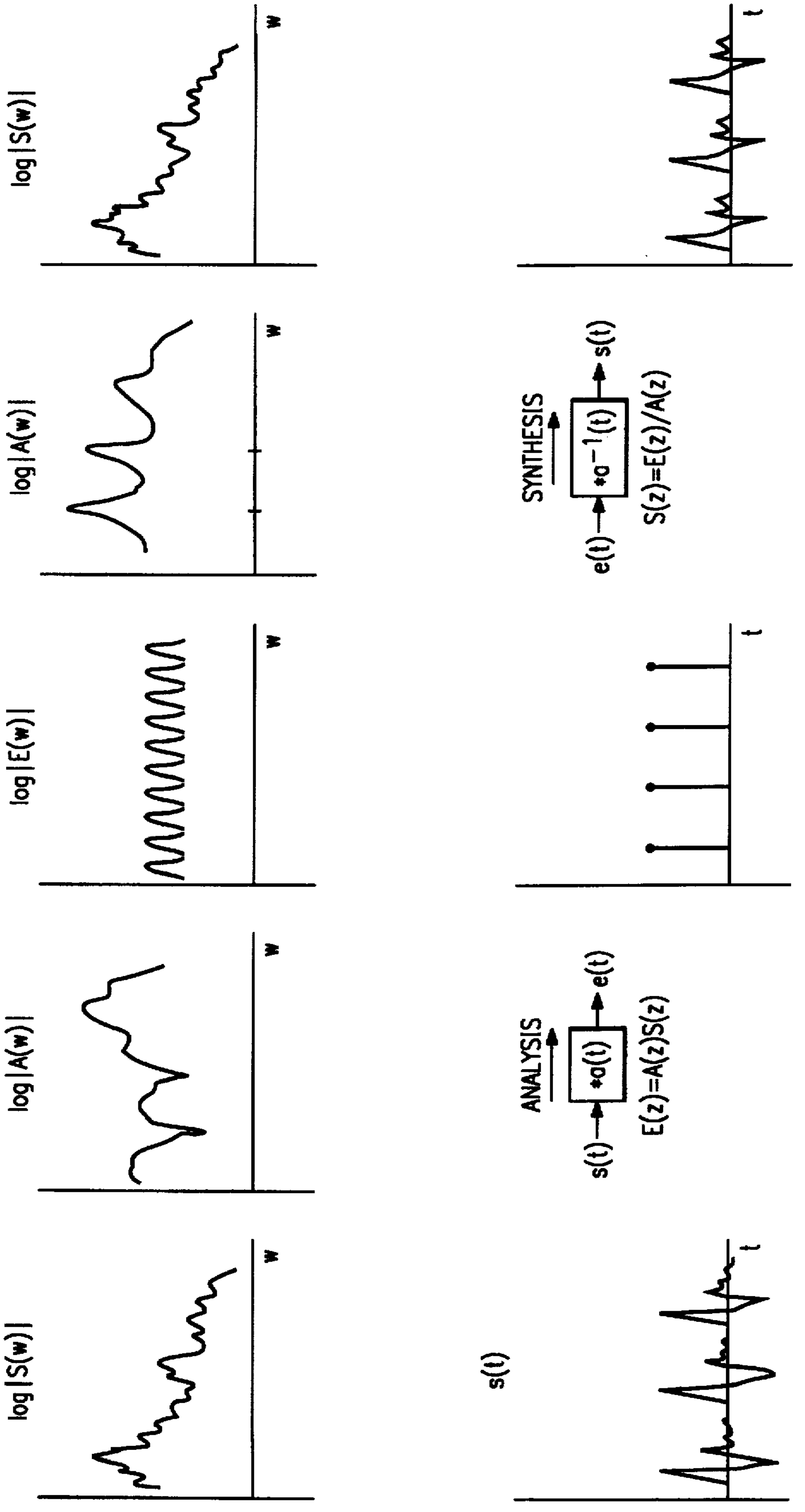
FIG. 4 indicates analysis and synthsis.
Figure 5:
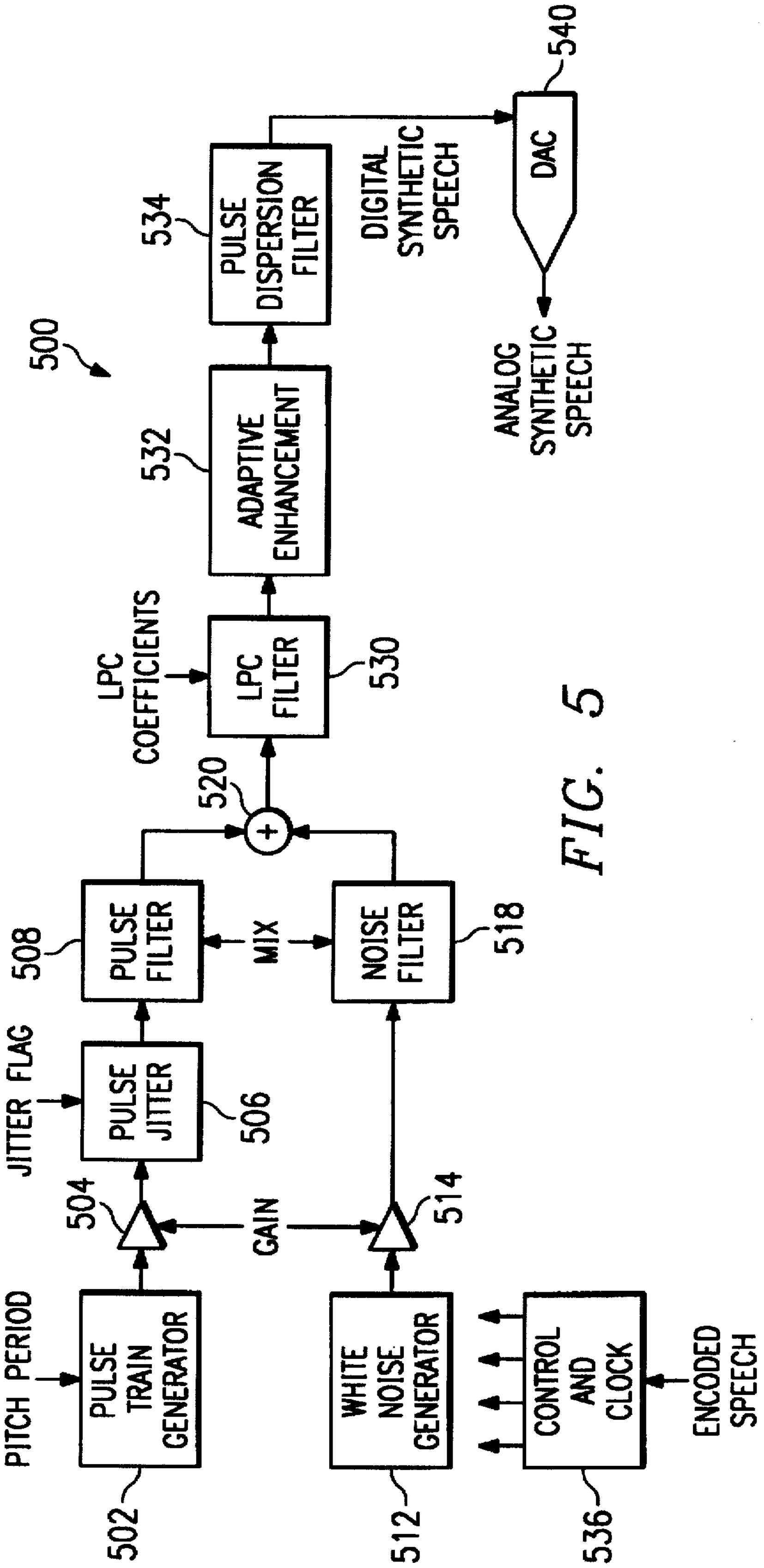
FIG. 5 is a block diagram of a first preferred embodiment synthesizer.

FIG. 5 illustrates in functional block form a first preferred embodiment speech synthesizer, generally denoted by reference numeral 500, as including periodic pulse train generator 502 controlled by a pitch period input, a pulse train amplifier 504 controlled by a gain input, pulse jitter generator 506 controlled by a jitter flag input, a pulse filter 508 controlled by five band voiced/unvoiced mixture inputs, white noise generator 512, noise amplifier 514 also controlled by the same gain input, noise filter 518 controlled by the same five band mixture inputs, adder 520 to combine the filtered pulse and noise excitations, linear prediction synthesis filter 530 controlled by 10 LSP inputs, adapative spectral enhancement filter 532 which adds emphasis to the formants, and pulse dispersion filter 534. Filters 508 and 518 plus adder 520 form a mixer to combine the pulse and noise excitations.

Figure 6:
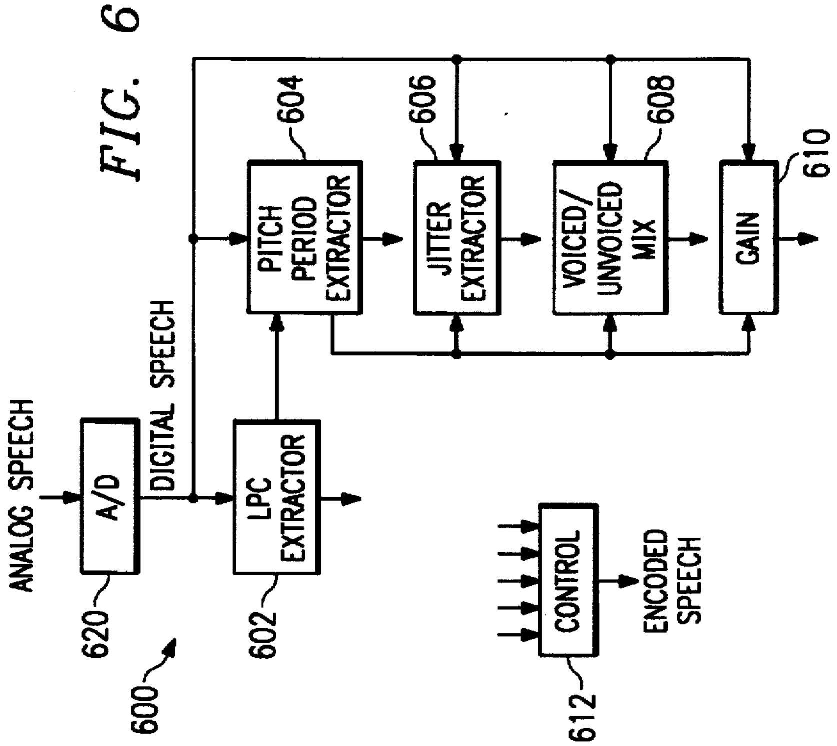
FIG. 6 is a block diagram of a first preferred embodiment analyzer.

The control signals (LPC coefficients, pitch period, gain, jitter flag, and pulse/noise mixture) derive from analysis of input speech. FIG. 6 illustrates in functional block form a first preferred embodiment speech analyzer, denoted by reference numeral 600, as including LPC extractor 602, pitch period extractor 604, jitter extractor 606, voiced/unvoiced mixture control extractor 608, gain extractor 610, and controller 612 for assembling the block outputs and clocking them out as a sample stream. Sampling analog-to-digital converter 620 could be included to take input analog speech and generate the digital samples at a sampling rate of 8 KHz.

Pulse train generator 502 of synthesizer 500 has an effective sampling rate of 16 times the speech sampling rate (8 KHz) followed by lowpass filtering and sampling rate decimation by a factor of 16 back to the 8 KHz rate. This higher effective sampling rate corresponds to a pitch period expressed in sixteenths of a speech sampling period by the analysis of the input speech. Such a pitch period analysis also permits use of correlations computed for fractional sampling period offsets and increases the reliability of voiced/unvoiced mixture for driving pulse filter 508 and noise filter 518.

The encoded speech may be received as a serial bit stream and decoded into the various control signals by controller and clock 536. The clock provides for synchronization of the components, and the clock signal may be extracted from the received input bit stream. For each encoded frame transmitted via updating of the control inputs, synthesizer 500 generates a frame of synthesized digital speech which can be converted to frames of analog speech by synchronous digital-to-analog converter 540. Hardware or software or mixed (firmware) may be used to implement synthesizer 500. For example, a digital signal processor such as a TMS320C30 from Texas Instruments can be programmed to perform both the analysis and synthesis of the preferred embodiment functions in essentially real time for a 2400 bit per second encoded speech bit stream. Alternatively, specialized hardware (e.g., ALUs for arithmetic and logic operations with filter coefficients held in ROMs, including the fractional pulse generator oversampled pulse values, RAM for holding encoded parameters such as LPC coefficients and pitch, sequencers for control, LPC to LSP conversion and back special circuits, a crystal oscillator for clocking, and so forth) which may hardwire some of the operations could be used. Also, a synthesizer alone may be used with stored encoded speech.

Applications

Figure 7:
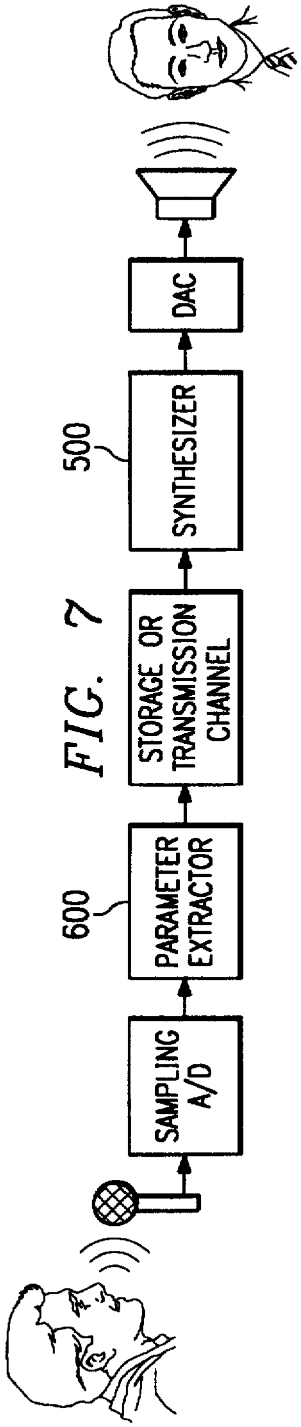

FIG. 7 illustrates applications of preferred embodiment analyzer and synthesizer random input speech, as in communications. Indeed, speech may be encoded and then transmitted at a low bit rate and then resynthesized upon receipt. But also, analog speech may be received, as over a household telephone line, by a telephone answering machine which encodes it for compressed digital storage and later synthesis playback.

Figure 8:
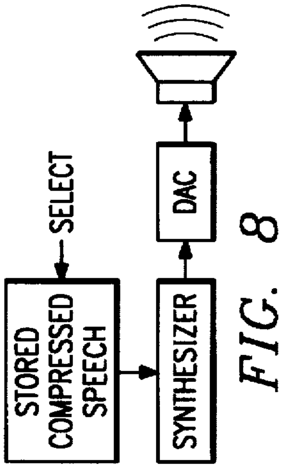
FIGS. 7–8 illustrate applications of the preferred embodiments.
Figure 9:
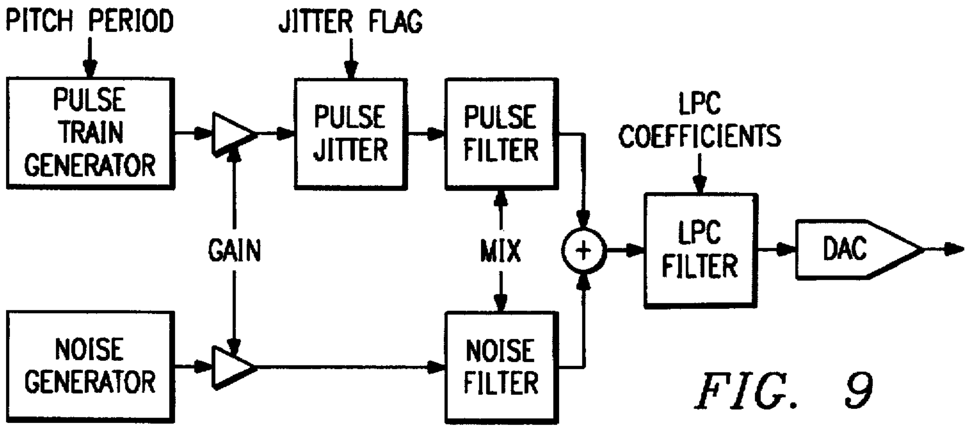
FIG. 9 is a block diagram of a second preferred embodiment synthesizer.
Figure 10A:
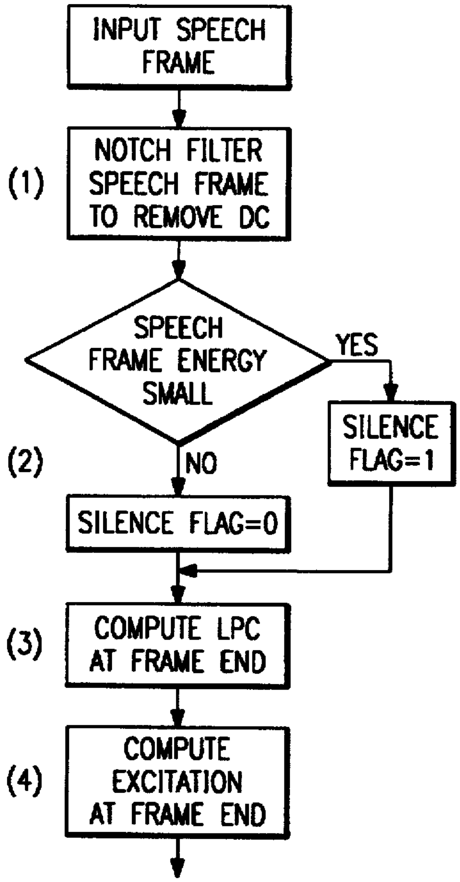
FIGS. 10*a*–11*c* are flow diagrams of the preferred embodiments.
Figure 10B:
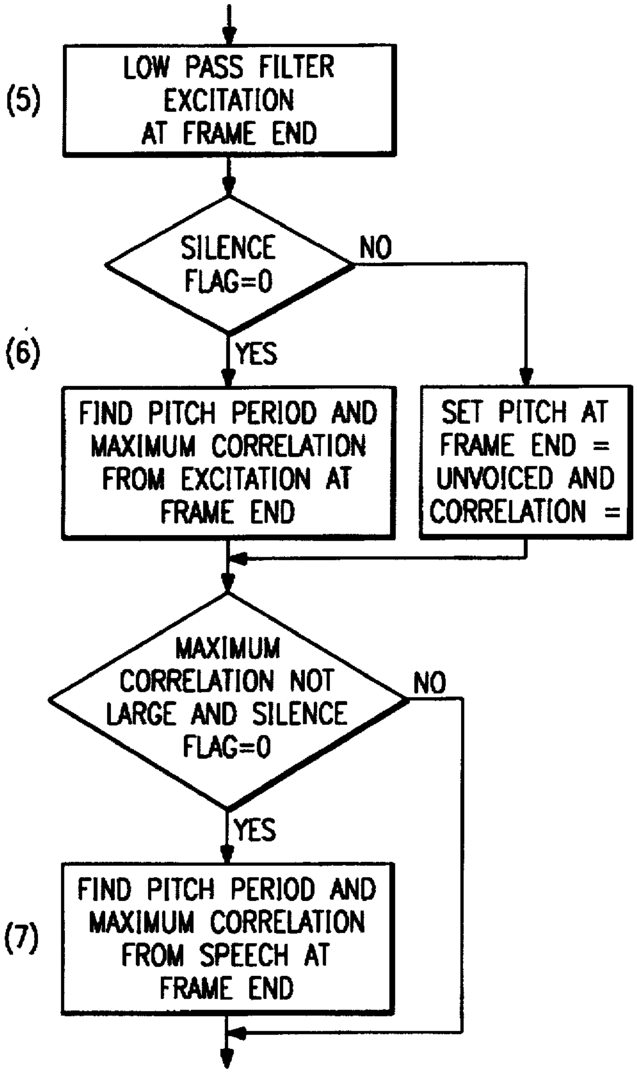
Figure 10C:
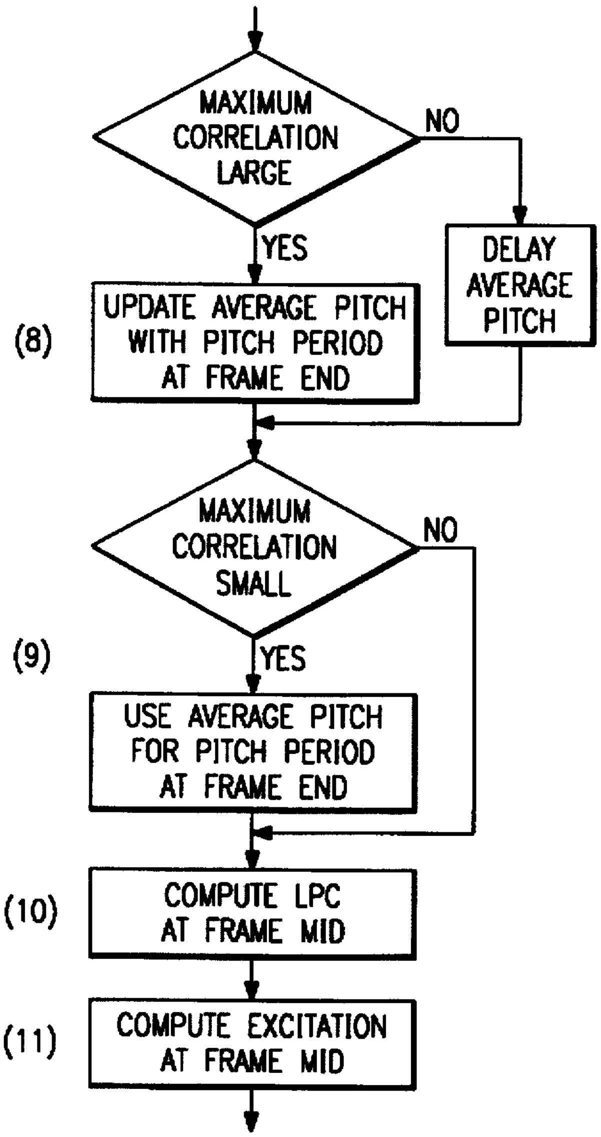
Figure 10D:
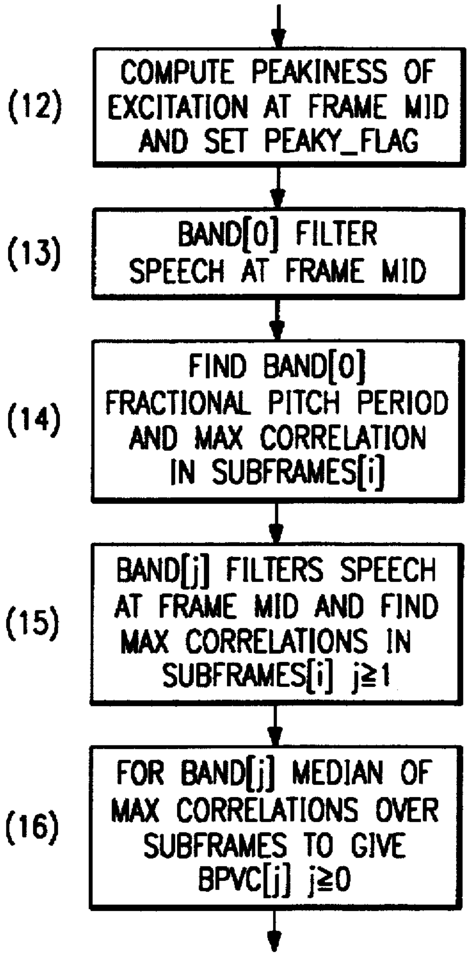
Figure 10E:
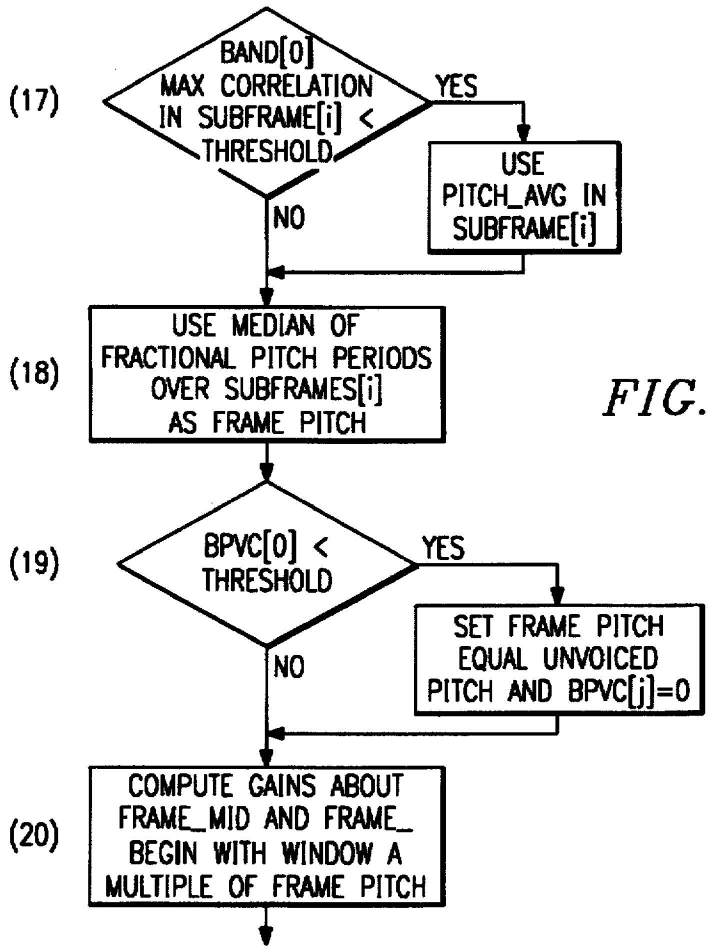
Figure 10F:
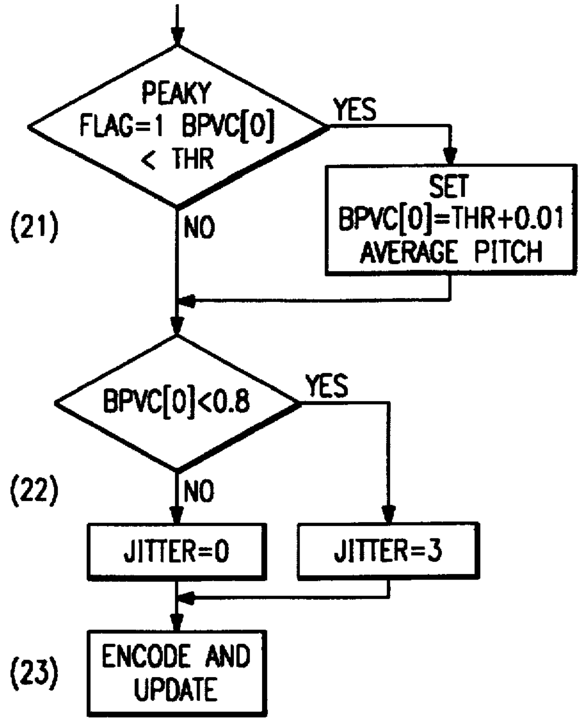

FIG. 8 shows use of a synthesizer alone with previously encoded and stored speech. That is, for items such as talking books the compression available from encoding reduces storage required. Similarly, items such as time stamps for analog telephone answering machines could use previously encoded dates and times and synthesize the day and time for analog recording along with a received analog message being recorded. Indeed, a simpler synthesizer such as shown in FIG. 9 could be used to permit simpler integrated circuit implementation.

The analysis and synthesis may be used for sounds other than just humna speech. Indeed, animal and bird sounds derive from vocal tracts, and various musical sounds can be analyzed with the linear predictive model.

Analysis

Figure 11A:
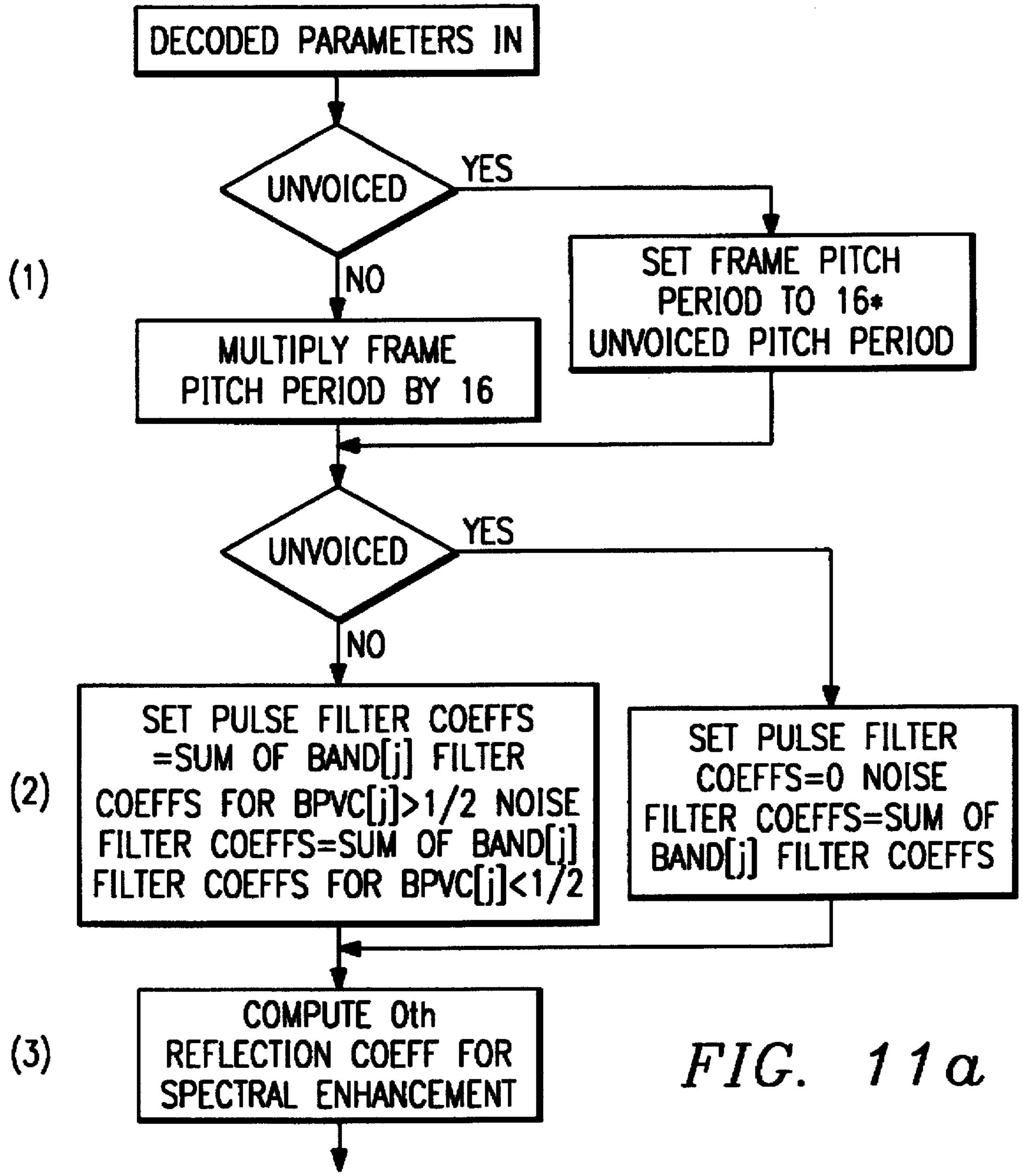
Figure 11B:
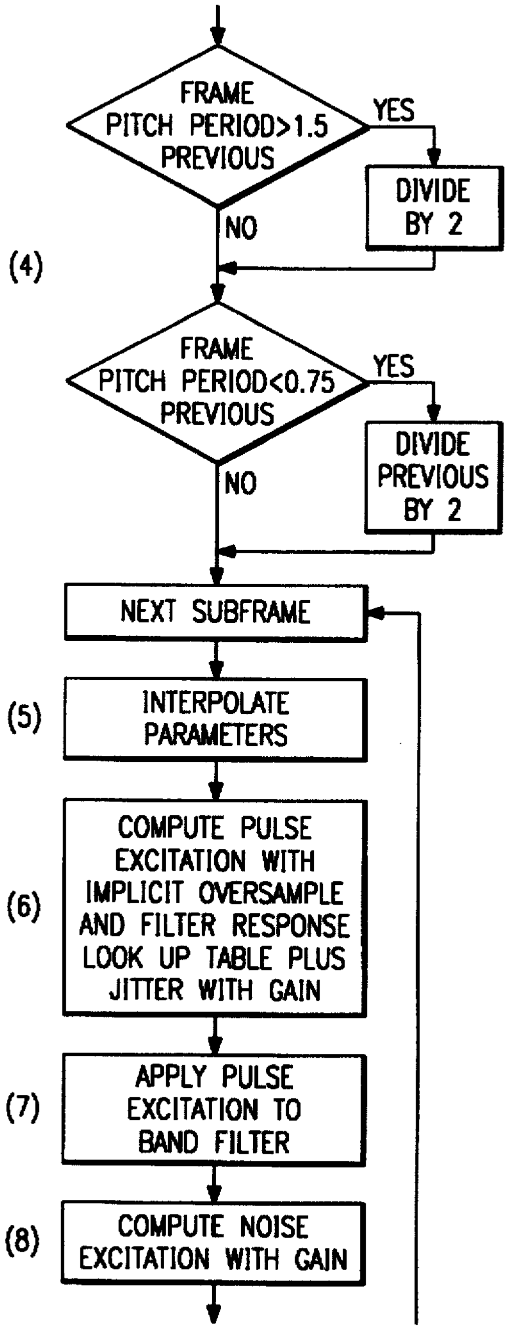
Figure 11C:
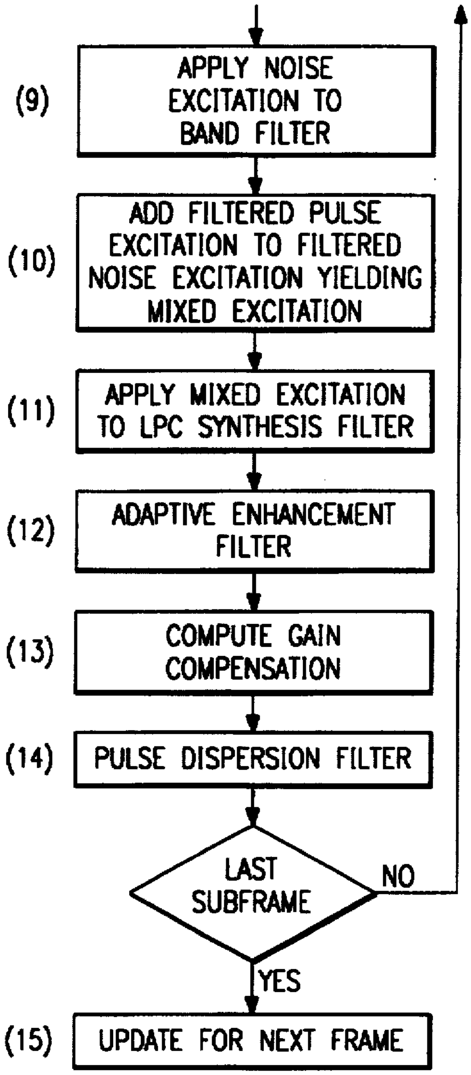

FIG. 10 is a flow diagram of a first preferred embodiment method of speech analysis (FIG. 11 is a flow diagram for the synthesis) for use in systems such as illustrated in FIGS. 7–8. The speech analysis to generate the synthesis parameters proceeds as follows.

(1) Filter an input speech frame (180 samples which would be 22.5 milliseconds at a sampling rate of 8 KHz) with a notch filter to remove DC and very low frequencies, and load the filtered frame into the top portion of a 470-sample buffer; the lower portion of the buffer contains the prior frame plus 110 samples of the frame before the prior frame. The analysis uses "frames" of various sizes selected from roughly the center of the buffer and thus the frame parameters output after an input frame do not exactly correspond to the input frame but more accurately correspond to a frame of offsets.

(2) Compute the energy of a 160 sample interval starting at the 150th sample of the 470-sample buffer. This is simply a sum of squares of the samples. If the energy is below a threshold, then the silence-flag is set and the frame parameters should indicate a frame of silence.

(3) Compute the coefficents for a 10th order filter A(z) using a 200 sample interval centered at the 310th sample; this amounts to an analysis about the frame end for a frame centered in the 470-sample buffer. The computation uses Durbin's algorithm which also generates the "reflection coefficients" for the filter.

(4) Use A(z) from step (3) to compute an excitation from the 321 sample interval centered at the frame end (310th sample). That is, apply E(z)=A(z)S(z) for an expanded frame of speech samples. Use this large sample interval for good low frequency pitch searching in following step (6).

(5) Lowpass filter (1200 Hz cutoff) the excitation of step (4) because pitch frequencies typically fall in the range of 100–800 Hz, so the higher frequencies can only obscure the fundamental pitch frequency.

(6) If the silence flag is set, then take the pitch at the frame end as unvoiced; otherwise perform an integer pitch search of the filtered excitation of step (5). This search computes crosscorrelations between pairs of 160-sample intervals with the intial pair being intervals with opposite endpoints at the frame end and successive pairs incrementally overlapping with the pair centered at the frame end. Thus this search involves 320 samples of filtered excitation centered at the frame end. The offset of the second interval with respect to the first interval which yields the maximum crosscorrelation defines an integer pitch period for the frame end.

Then check whether the integer pitch period is actually a multiple of a fundamental (possibly noninteger) pitch period. This also generates a fraction-of-sampling-period adjustment to an integer pitch period, so a more accurate pitch period may be used in the following. This fractional period computation uses interpolation of adjacent crosscorrelations, and it also adjusts the maximum crosscorrelation by interpolation of adjacent crosscorrelations. In particular, let P denote the integer pitch period, let L denote the length of the correlation which is the maximum of P and 60, and let c(0,P) denote the (unnormalized) crosscorrelation of the first interval (beginning (L+P)/2 samples before the center of the subframe) with the second interval starting P samples after the first interval. Thus c(0,P) was the largest crosscorrelation and defined P. Similarly, let c(P,P+1) be the crosscorrelation of an interval starting P samples after the first interval with an interval starting P+1 samples after the first interval; and so forth for other c( . . . ) expressions. Then the fractional period adjustment will be positive if c(0,P+1) >c(0,P−1) and negative for the other inequality. For the negative case, decrement P by 1 and then the positive case will apply. For the positive case, the fraction q of a sampling period to add to P equals:

$$\frac{c(0,P+1)c(P,P)-c(0,P)c(P,P+1)}{c(0,P+1)[c(P,P)-c(P,P+1)]+c(0,P)[c(P+1,P+1)-c(P,P+1)]}$$

And the revised crosscorrelation is given by $$\frac{(1-q)c(0,P)+qc(0,P+1)}{\sqrt{c(0,0)[(1-q)^2c(P,P)+2q(1-q)c(P,P+1)+q^2c(P+1,P+1)]}}$$

Next, check for fractions of P+q as the real fundamental pitch period by recomputing the crosscorrelations and revised crosscorrelations for pitch periods (P+q)/N where N takes the values 16, 15, 14, . . . , 2. If a recomputed revised crosscorrelation exceeds the originally computed revised crosscorrelation by a factor of 0.75, then stop the computation and take corresponding (P+q)/N as the pitch period.

Note that even if only integer pitch periods were to be transmitted or stored, the use of fractional period adjustment for more accurate crosscorrelations makes the checking for pitch period multiples more robust. For example, if the true fundamental pitch had a period of 30.5 samples, then the crosscorrelations at 30 and 31 sample offsets may both be smaller than the crosscorrelation of the double period at a 61 sample offset; however, computation to find the pitch period of 30.5 followed by transmission of a pitch period of either 30 or 31 would yield better synthesis. Recall that the pitch period often varies during a sound by a few percent. Thus, in the example, a jumping from a pitch period of 30 to a period of 61 and back to 30 or up to 31 may occur if a fractional period analysis is not used.

(7) If the maximum crosscorrelation of step (6) is less than 0.8 and the silence flag is not set, the excitation may not show a strong periodicity. So perform a second pitch search, but using the speech samples about the frame end rather than the lowpass filtered excitation samples. This pitch search also computes crosscorrelations of 160-sample intervals and also checks for the pitch period being a multiple of a fundamental pitch period by using the fractional pitch correlations, and the maximum crosscorrelation's offset defines another pitch at the frame end. Take the larger of the two maximum crosscorrelations (normalized) as the maximum crosscorrelation (but limited to 0.79), and take the corresponding pitch as the pitch at the frame end.

(8) If the maximum crosscorrelation of the step (6) is greater than 0.8, then update the frame average pitch with the found pitch. Otherwise, decay the average pitch towards a default pitch.

(9) If the maximum crosscorrelation of step (7) is less than 0.4, then set the pitch at the frame end to be equal to the average pitch.

(10) Compute the the coefficents for a 10th order filter A(z) using a 200 sample interval centered at the 220th sample; this amounts to an analysis about the frame middle for a frame centered in the 470-sample buffer. The computation again uses Durbin's algorithm which also generates the "reflection coefficients" for the filter.

(11) Use A(z) from step (10) to compute an excitation from the 180 sample interval centered at the frame middle (220th sample). That is, apply E(z)=A(z)S(z) for a frame of speech samples.

(12) Compute the peakiness (ratio of $1^2$ to $1^1$ norms) of the excitation at the frame middle of step (11). If the ratio is at least 1.8, then set the peaky flag. Otherwise set the peaky flag at 0. The peaky flag will be checked in step (21).

(13) Filter the speech (440 samples centered about the frame middle) with a lowpass filter (from 0 Hz to 400 Hz at 6 dB rolloff). The spectrum will be split into five frequency bands with the mixture of voiced and unvoiced independently determined for each band. This lowpass band is band[0] and the other bands are as follows in terms of 6 dB frequencies: band[1] is 400 Hz to 800 Hz, band[2] is 800 Hz to 1800 Hz, band[3] is 1800 Hz to 2800 Hz, and band[4] is 2800 Hz to 400 Hz (the Nyquist frequency for sampling at 8 KHz). Band[0] will also be the band for pitch determination.

(14) Divide the band[0]-filtered speech into three subframes: subframe[0] is centered at the 160th sample, subframe[1] centered at the 220th sample, and subframe[2] centered at the 280th sample. Then for each of the subframes compute a fractional pitch period as a perturbation of the integer pitch period at the frame end (step (6)) and also as a perturbation of the integer pitch period at the frame beginning (which was the frame end corresponding to the preceding input speech frame) as follows. First, compute crosscorrelations of a first sample interval of length equal to the integer pitch period (or at least length 60) and beginning (length+pitch)/2 samples before the subframe center with second sample intervals of the same length and starting between 5 samples before through 5 samples after the end of the first interval. The offset of the second interval with respect to the first interval which yields the maximum crosscorrelation defines a revised integer pitch period. Note that this pitch search is local and only considers variations of up to 5 samples in pitch period.

Next, as in step (6), derive a fraction-of-sampling-period adjustment to this revised integer pitch period by interpolation of adjacent crosscorrelations, and also adjust the maximum crosscorrelation by interpolation of adjacent crosscorrelations. In particular, let P denote the revised integer pitch, and c(0,P) denote the (unnormalized) crosscorrelation of the first interval (ending 2 or 3 samples before the subframe center) with the second interval starting P samples after the first interval. Thus c(0,P) was the largest crosscorrelation. Similarly, let c(P,P+1) be the crosscorrelation of an interval starling P samples after the first interval with an interval starting P+1 samples after the first interval; and so forth for other c( . , . ) expressions. Then the fractional adjustment will be positive if c(0,P+1)>c(0,P−1) and negative for the other inequality. For the negative case, decrement P by 1 and then the positive case will apply. For the positive case, the fraction q of a sampling period to add to P equals:

$$\frac{c(0,P+1)c(P,P)-c(0,P)c(P,P+1)}{c(0,P+1)[c(P,P)-c(P,P+1)]+c(0,P)[c(P+1,P+1)-c(P,P+1)]}$$

And the revised crosscorrelation is given by $$\frac{(1-q)c(0,P)+qc(0,P+1)}{\sqrt{c(0,0)[(1-q)^2c(P,P)+2q(1-q)c(P,P+1)+q^2c(P+1,P+1)]}}$$

The revised crosscorrelations will be denoted subbpcorr[0][i] where the index 0 refers to the band[0] and the index i refers to the subframe.

Note that other approaches to computing fractional period pitch exist. In particular, the input speech could have its sampling rate expanded by interpolating 0s between samples followed by a 0–4 KHz (Nyquist frequency) lowpass filter to remove higher frequency images generated by the sampling rate expansion. See, Crochiere and Rabiner, Multirate Digital Signal Processing (Prentice-Hall 1983), chapter 2. Then this higher sampling rate permits determination of pitch periods which include a fraction of the original (8 KHz rate) sampling period. Similarly, crosscorrelations can be computed directly with these fractional pitch offsets.

After finding P+q, again perform a check to see whether P+q is the fundamental pitch period or perhaps only a multiple of the fundamental pitch period.

(15) For each j=1,2,3,4, filter the speech into band[j] (see step (13)). Again for each j, divide the band[j]-filtered speech into three subframes: subframe[0] is centered at the 160th sample, subframe[1 ] centered at the 220th sample, and subframe[2] centered at the 280th sample. Then for each of the subframes use the fractional pitch period P+q from step (14) and compute revised crosscorrelations subbpcorr[j][i] by the formula in step (14). Also, take the absolute value (envelope) of the band[j]-filtered speech, smooth it, and again use P+q and compute revised crosscorrelations for subframes. If an envelope revised crosscorrelation is larger, use it in place of the corresponding subbpcorr[j][i].

(16) For each band[j](j=0, . . . , 4), take the median of the subbpcorr[j][i] over the three subframes and call the result bpvc[j]. The bpcv[j] will yield the voiced/unvoiced decision information sent to the synthesizer to control filters 508–518 in FIG. 5.

(17) If a revised crosscorrelation subbpcorr[0][i] in a subframe for band[0] is less than unvoiced threshold, replace the subframe fractional pitch period with the average pitch period.

(18) Use the median of the band[0] subframe fractional pitch periods to get the frame pitch period.

(19) If the subframe median revised correlation for band [0] Copvc[0]) is less than threshold, replace the frame pitch period with unvoiced pitch period.

(20) Compute the power of the speech centered at the frame middle and at the frame beginning using a length of samples which is a multiple of the frame pitch period (synchronous window length); these powers will be the two gain[i] sent to control the synthesizer gains.

(21) If the peaky flag is set and bpvc[0] is less than threshold, then set bpvc[0] equal to threshold plus 0.01 and set the frame pitch to the average pitch. In other words, the frame is forced to be voiced if the peaky flag is set.

(22) If bpcv[0] is less than 0.8, set the jitter to 3; otherwise the jitter is 0. Use the jitter of the pitch period to vary the pitch period in the synthesizer in order to mimic erratic glottal pulses which are often encountered in voicing transitions.

(23) Compute LSP from LPC for encoding. Update frame pitch and correlation at frame end to be at frame beginning for the next frame. And encode the LSP, frame pitch period, bpvc[j], gain[i], and jitter for transmission or storage and eventual use by the synthesizer.

Encoding-transmission/storage-decoding

For a transmission or storage rate of 2400 bits per second, the preferred embodiment uses 54 bits per 22.5 millisecond frame (180 samples at 8 KHz sampling rate). The bits are allocated as follows: 34 bits for LSP coefficients for a 10th order A(z) filter; 7 bits for frame pitch period (with one code reserved to show overall voicing); 8 bits for gain sent twice per frame; 4 bits for the voiced/unvoiced binary decision in each band[j]; and 1 bit for the jitter flag. Note that the five bands only require 4 bits because the lowest band determines overall voicing.

Human speech pitch frequency generally ranges from 50 Hz to 800 Hz. At a sampling rate of 8 KHz, this correspond to pitch periods of 160 samples to 10 samples. The low resolution at the 10 sample period (generally, high pitched female speakers) for integer pitch periods was recognized and demanded the fractional pitch period of the foregoing. The preferred embodiment encoding of the fractional frame pitch period, which also considers the use of only 7 bits for the pitch period, utilizes a logarithmic encoding of the range of 10 samples to 160 samples as follows. Let P be the fractional frame pitch period; then $32\times\log_2(P/10)$ rounded off to the nearest integer lies in the range of 0 to 128. This may be expressed in binary with 7 bits. Recall one extreme value is taken as indicating an unvoiced frame. After transmission, these 7 bits are decoded to yield the full fractional pitch period.

Synthesis

FIG. 11 is a flow diagram of the operations of synthesizer 500 of FIG. 5. The synthesis may be done in a general purpose computer with speech capabilities (speaker) or general purpose digital signal processors driving audio output, or with hardware adapted to the synthesis operations. FIG. 11 includes the following steps and omits the coding-decoding of the transmitted/stored bits.

(1) If the frame is unvoiced, then set the frame pitch period to 16 times the unvoiced pitch period, this is just adjusting for the oversampling by a factor of 16 implicit in the fractional frame pitch period of the analysis. Otherwise, for a voiced frame just multiply the frame pitch period by 16.

(2) If the frame is unvoiced, then set the pulse filter 508 coefficients to 0 and the noise filter 518 coefficients equal to the sum over the bands of the band[j] filter coefficients. Otherwise, for a voiced frame set the pulse filter coefficients to the sum over bands with bpvc[j]>0.5 of the band[j] coefficients and the noise filter coefficients to the sum over bands with bpvc[i]≦0.5 of the band[j] coefficients. This is the voiced/unvoiced decision implementation for the five band filters 508 and 518.

(3) Compute the first reflection coefficient from the LSP, and set the current spectral fit parameter to one half of the coefficient if it is negative, otherwise take the parameter as 0. This parameter drives adaptive enchancement filter 532.

(4) Check for frame pitch period doubling or halving as compared to the previous frame's pitch period. If the frame pitch is more than 1.5 times the previous frame pitch, then divide the frame pitch by 2. If the frame pitch is less than 0.75 times the previous frame pitch, then divide the previous frame pitch by 2.

(5) Divide the frame into 6 subframes, and for each subframe interpolate the current parameters (LSP, pulse filter coefficients, noise filter coefficients, gain[i], frame pitch period, jitter, and spectral tilt) with the parameters of the previous frame. For the first subframe, use 5/6 of previous and 1/6 of current; for the second subframe, use 4/6 of previous and 2/6 of current, and so forth.

(6) For each subframe compute the pulse excitation by generator 502 using the interpolated parameters. Straightforward oversampling by 16 to directly generate the excitation pulse train followed by lowpass filtering (to prevent aliasing) and sampling rate compression by a factor of 16 to return to the 8 KHz sampling rate may be performed implicitly as follows. The antialiasing lowpass filter responds to the pulse train by a sequence of (possibly overlapping) impulse responses; and the impulse response of the lowpass filter can be stored in a table. Thus reading values from the table with offsets of 16 samples implements the lowpass filtering plus sampling rate compression. Synthesizer 500 uses a table of 160 values which represents a 10 sample approximation to the lowpass impulse response at the compressed (original) sampling rate of 8 KHz. Synthesizer 500 generates the pulse train for a fractional frame pitch by maintaining a counter for pitch period represented at a sampling rate of 16 times the input sampling rate, decrementing this counter by 16 for each output sample, and reading the appropriate sample value from the oversampled impulse response table. If the counter is less than 160, it is used as an index to read the table to give a nonzero sample output; otherwise, a zero sample is output. Thus 10 successive nonzero samples (as the counter decrements by 16s through the range 1–160) will be followed by zeros, the number of zeros depending upon the pitch period. When the counter becomes negative, an oversampled pitch period (plus any jitter from random number jitter generator 506) is added to the counter and represents the next pulse in the pulse train.

(7) Multiply the pulse excitation by the gain (504) and then apply the pulse excitation to pulse filter 508.

(8) For each subframe compute the noise excitation with a random number generator 512.

(9) Multiply the noise excitation by the gain (514) and then apply the noise excitation to noise filter 518.

(10) Add the filtered pulse excitation and filtered noise excitation to form the mixed excitation for the subframe by adder 520.

(11) Filter the mixed excitation with the LPC synthesis filter 530 using the interpolated LPC from step (5) to yield a synthetic speech subframe.

(12) Filter the output of LPC filter 530 with the adaptive enchancement filter 532 which is based on the LPC coefficients and which boosts the formant frequencies without introducing additional distortion. In particular, the filter 532 is a bandwidth expanded version of the LPC filter 530 made by replacing 1/A(z) with 1/A(0.8 z) followed by a weaker version made by replacing A(z) with A(0.5 z) and then including a simple first order FIR filter based on spectral tilt.

(13) Compute gain of the filtered synthetic speech and use this to compensate gain of the LPC filter 530.

(14) Filter with pulse dispersion filter 534. This essentially spreads out the pulse train pulses into narrow triangular pulses. The output of filter 534 is the synthesized speech subframe.

(15) After processing steps (5)–(14) for each subframe to yield a frame of synthetic speech, update by using the current parameters as the previous parameters for the next frame.

Modifications and variations

Many modifications and variations of the preferred embodiments may be made while retaining features such as fractional pitch periods to overcome high pitched speaker problems with mixed excitation linear prediction speech coding and synthesis, fractional pitch period based correlations to make integer pitch period encoding accurate, and fractional pitch periods to allow accurate nonlinear encoding of pitch period.

For example, the five band filters of the pulse and noise excitations could be replaced with N band filters where N is any integer greater than one; the adaptive enhancement or pulse dispersion filters could be used alone; the range of samplings and numbers of subframes could be varied.

What is claimed is:

1. A method of encoding sounds, comprising the steps of:

(a) providing frames of input sounds at a first sampling rate having a first sampling period;

(b) determining linear prediction coefficients for a frame;

(c) determining a pitch period for said frame;

(d) determining correlation strengths for each of N frequency bands of said frame with N an integer greater than 1; and (e) wherein said determining a pitch period of step (c) and determining correlation strengths of step (d) use pitch periods which include nonintegral multiples of said sampling period for a plurality of said frames.

2. The method of claim 1, wherein:

(a) said determining a pitch period of step (c) uses interpolation of pitch period estimates and correlation estimates based on integral multiples of said sampling period.

3. The method of claim 1, wherein:

(a) said determining a pitch period of step (c) includes a first pitch period estimate using fixed length correlations followed by a second pitch period estimate using interpolation of correlations with lengths varied about said first pitch period estimate.

4. The method of claim 1, further comprising the step of:

(a) determining a pitch period code as a logarithmic function of said pitch period of step (c) of claim 1.

5. A synthesizer for encoded sounds, comprising:

(a) a pulse train generator with output at a first sampling rate;

(b) a noise generator with output at said first sampling rate;

(c) a mixer with inputs coupled to said pulse train generator and said noise generator;

(d) a linear predictive filter with input coupled to an output of said mixer; and (e) wherein said pulse train generator outputs signals corresponding to a sampling rate compression of single pulses at a second sampling rate for said second sampling rate being a multiple of said first sampling rate.

6. The synthesizer of claim 5, wherein:

(a) said pulse train generator includes a gain amplifier; and (b) said noise generator includes a gain amplifier.

7. The synthesizer of claim 5, wherein:

(a) said mixer includes a first multiband filter coupled to said pulse train generator, a second multiband filter coupled to said noise generator, and an adder with inputs coupled to the outputs of said first and second multiband filters.

8. A speech system, comprising:

(a) a receiver for frames of input speech with a first sampling rate;

(b) an analyzer coupled to said receiver, said analyzer including:

(i) a linear predictive coefficients extractor;

(ii) a pitch period extractor, said pitch period extractor with resolution greater than a single period of said first sampling rate; and (iii) a correlation extractor for each of N frequency bands with N an integer greater than 1;

(c) a memory coupled to said analyzer and storing outputs of said extractors;

(d) a synthesizer couple to said memory, said synthesizer including:

(i) a pulse train generator with output at said first sampling rate and with periodicity read from said memory;

(ii) a noise generator with output at said first sampling rate;

(iii) a mixer with inputs coupled to said pulse train generator and said noise generator and with the mixture of pulse train generator output and noise output read from said memory; and (iv) a linear predictive filter with input coupled to an output of said mixer and with coefficients read from said memory.

* * * * *